Figure 1:
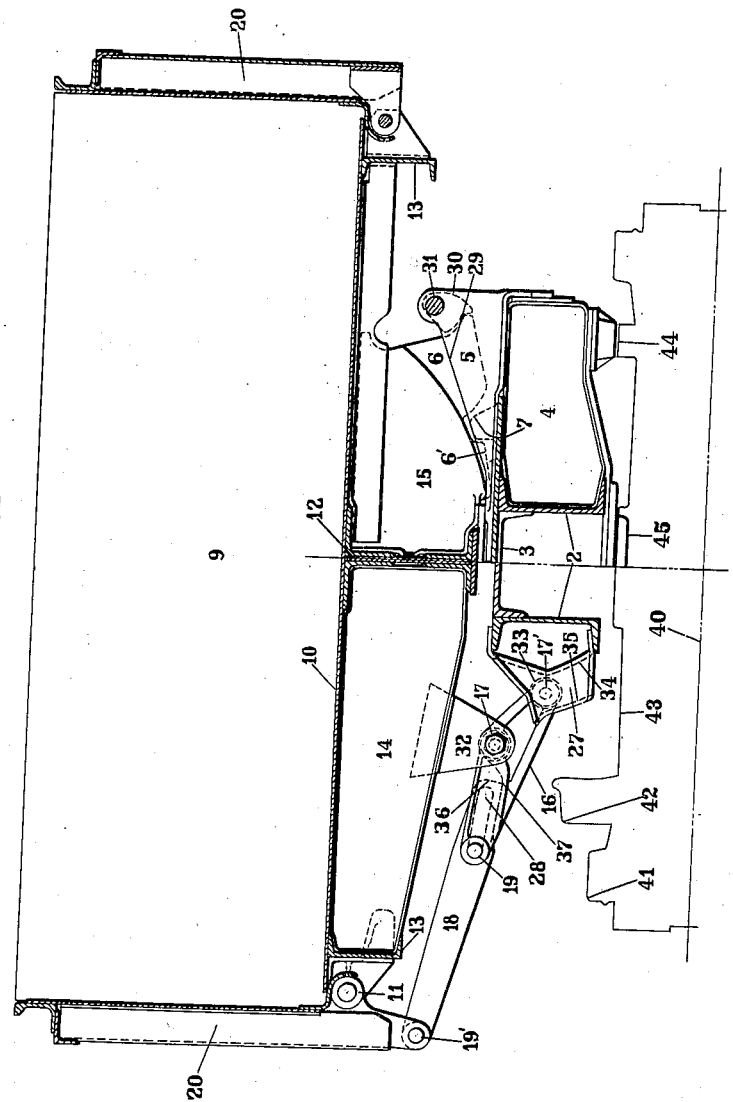

May 30, 1939.  C. H. CLARK  2,160,197
CAR DOOR CONTROL
Filed May 31, 1928  2 Sheets-Sheet 1

INVENTOR

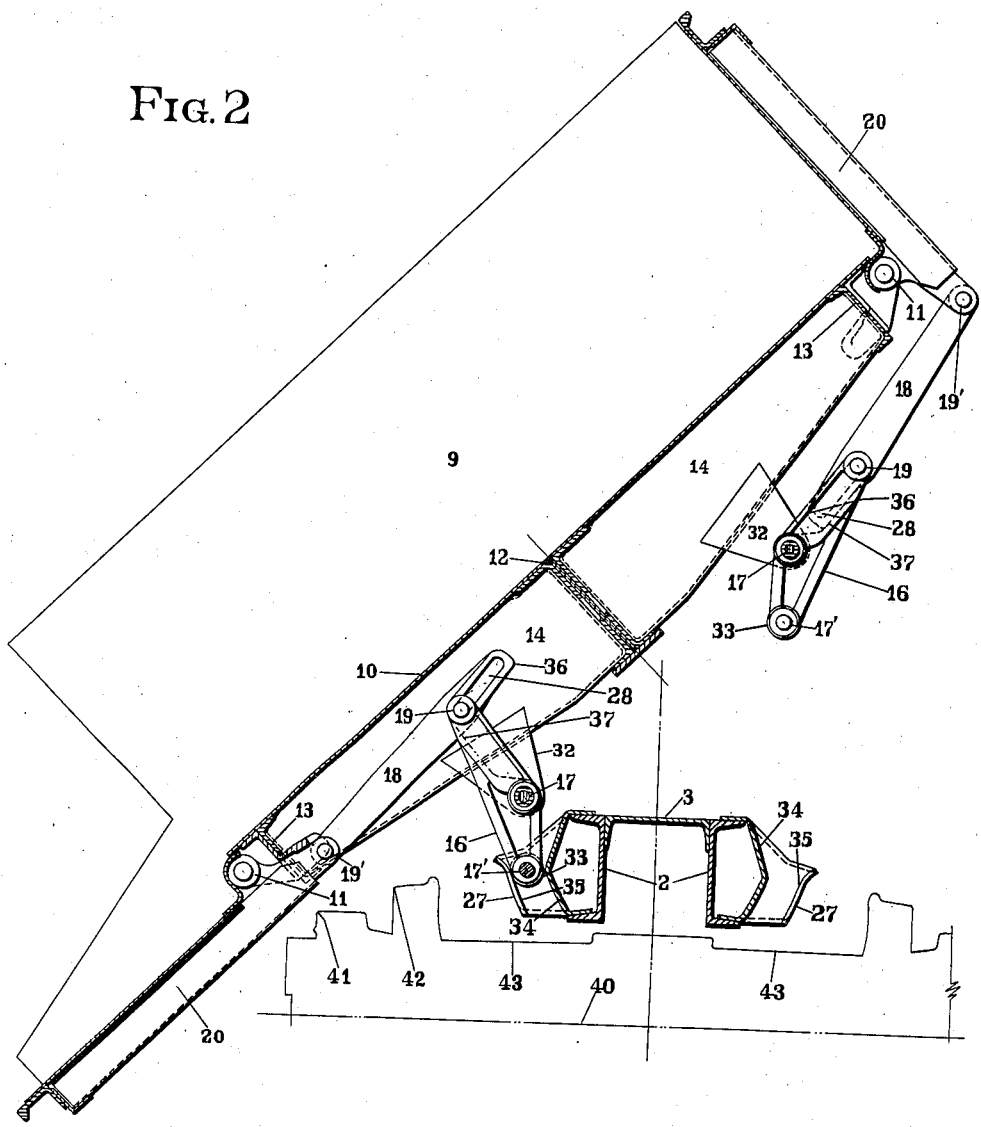

Patented May 30, 1939

2,160,197

UNITED STATES PATENT OFFICE 2,160,197

CAR DOOR CONTROL

Charles H. Clark, Bethel Township, Allegheny County, Pa., assignor, by mesne assignments, to Henry Fort Flowers, Findlay, Ohio Application May 31, 1928, Serial No. 281,874

3 Claims. (Cl. 105—264)

My invention relates to tilting side dump cars and similar structures in which a container, called the body, rotates to open position to discharge the load, and in which the sides of the body are equipped with hinged doors to retain the lading when in normal upright position, and to discharge it farther out than the edge of the body when in open position. A common adaptation applies two such doors in pairs to opposite sides of the body with provision for holding the upmoving door closed and for opening the downturning one.

The invention pertains particularly to the door motion control, being of the character shown in United States Patent No. 1,333,293, issued to this applicant and Howard L. Beach, March 9, 1920, and in which the door control mechanism is actuated by the movement of the body.

The principal market for this device is on railroad dump cars, altho in recent years automobile dump trucks present a field for its use. The clearance cross section through which these vehicles are required to pass in service has established limiting transverse dimensions. In both railroad cars and dump trucks the height of the wheels and arrangement of trucks and underframe are largely standardized for wide ranges of cubical and weight capacities in the body. The established standards for railroad cars and automobile chassis present limitations, to a large extent determining the range of utility of devices of the character here described by limiting the generally usuable ones to such as not only coordinate the motion of the door with that of the body, but also do it without sacrifice of load carrying cross section or standards of design. An object of the invention is to improve the arrangement and relation of the parts of the door control mechanism so that no additional clearances with relation to the underframe, trucks, and wheels are required over those of the body in open position.

In order to meet conditions of loading, transporting and dumping, it is necessary that the underframe, body and doors be built of heavy construction relative to the weight of the pieces used in the door control mechanism. The body and doors being subject to like forces, and having largely synchronous vibrations, the mechanism is established with precision as between these two elements. Train shocks are primarily applied to the underframe. In this connection, it will be noted that dump cars are used over rough roadways, causing twisting in the underframe when the track is not level and side motion in it when running on curves. These distortions of the underframe materially affect the reliability of the door control mechanism if it be too closely assembled with the underframe. In any case, a three element structure, in which any one or two of the elements may be subjected independently to heavy shock or distortion, presents conditions for injury to a relatively light mechanism too closely assembled with all three. An object of the invention is to relieve the door control mechanism from strains caused by conditions not related to its functions. An object of the invention is to establish and maintain practically precise relationship between the body and door coincidently with relative freedom for the mechanism in its relation to the underframe.

Dump cars in service have periods of idleness during which they stand out exposed to the weather. At such times the connections between moving parts become stiffened by rust and corrosion. It is, therefore, desirable that friction contacts between moving parts be reduced to a minimum, and that they be limited to low resistance lever arms as compared with the leverage through which the operating forces are applied to move them. Objects of the invention are to reduce the number of moving parts in the door control mechanism and to improve the mechanical efficiency.

In moving a dump car which is being held in open position by application of dumping power, it is sometimes desirable to permit the door to rotate upwardly on its hinges independently of the motion of the body. An object of the invention is to provide means for rotating the door independently of the body when in open position.

The applicant's experience in applying downturned doors to dumping vehicles has been that it is preferable for the body to rotate on an axis at or on progressing axes approaching the dumping side, thus counterbalancing the varying leverage of the doors when one is opening and the other is closed. When the car returns to closed position by gravity, the application of power to operate is simplified to the action of opening only.

The invention is, therefore, illustrated as applied to a rocker dump car, in which the right half of Fig. 1 is a cross section at the bolster of a railroad dump car, and the left half is a cross section at a door control mechanism in upright position; and, Fig. 2 is a cross section at a door control mechanism with the body tilted and a door in open position.

In the illustrations, 2 is a pair of longitudinal sills about which the underframe is built, they being held together lengthwise by channel 3. Underframe bolster 4 is framed transversely and symmetrically about the center sills 2 with a rocker stand or rack 5 across its upper surface.

The body is brought together about a central longitudinal beam 12 to which rocker formed bolster 15 is framed in transverse alignment with rack 5 on bolster 4 of the underframe. The body rotates through its bolster 15 on rack 5 for opening and closing. Suitable tooth formed projections 6, 6' and 7 prevent the rocker bolster 15 from slipping in its contact with surface 29 of the rack 5. Tooth 6 is so formed as to engage the body latching member 30 designed to rotate on shaft 31 in the rack 5 for releasably holding the body in upright position. The means for rotating the shaft 31 is not shown, as it is in part the subject of separate application for patent, and has only incidental relation to the subject matter of this invention.

At the positions at which door operating mechanisms are applied to the car, a pair of diaphragms 14 are framed to the central beam 12 of the body. Plate 10 is the usual floor member connected to the upper surfaces of the body framing members, and 9 is the end of the car in view beyond the position of the cross sections, Fig. 1 and Fig. 2. The outer ends of the body diaphragms 14 are framed to longitudinal side sills 13, to which hinges 11, on which doors 20 rotate, are also attached to the body. In order to secure leverage about hinges 11 to support and operate door 20, the door stakes opposite the door control mechanism project below hinges 11, forming pin connections with links 18 at 19', links 18 extending inwardly therefrom to pin connections 19 in bell cranks 16. Links 18 are provided with slotted connections 28 at and inwardly from their engagement with pin connections 19. Bell cranks 16 are mounted to rotate on pin connections 17 suspended from diaphragms 14 in bearings 32, there being a pair of these bearings 32, as well as corresponding diaphragms 14, at each position of application of a door control mechanism to the car, so that bell cranks 16 may rotate freely between them. The third pin position 17' in the bell crank 16 is equipped with rollers 33 which have loose engagement between guideways 34 and 35 integral parts of pieces 27 attached to underframe sills 2. At the inwardly extending end of each link 18 is an extension beyond pin 19 marked 36 which rests in corresponding clevis formed portion 37 of bell crank 16 when the body is in upright position, thus forming a toggle at 19 which locks the door to the body when in closed position. As the body and door approach closed position from the downturning side, the relationship of the pin connections 17, 19 and 19' pass through a straight line, the toggle 19 thereafter moving without outside application of power to a position somewhat below a line between 17 and 19'. The amount of break-through of the toggle below a line between 17 and 19' increases the amount of clearance that may be given to the rollers 33 in their relation to guides 34 and 35 of piece 27 attached to the underframe.

Referring now to Fig. 2 on the downturning side, the various parts described are shown in open position. As the body has been rotated on rocker 15 traveling on line 29 of rack 5 to open position, it has overridden toggle 19, causing it to open by downward and outward pressure at 17', thus reducing the distance between 17 and 19', and thereafter inducing rotation of the bell crank 16 about its pin position 17' by bringing rollers 33 into contact, first with guides 34 and later with guides 35 as bearings 32 carry pin connections 17 inwardly in their movement toward the center of the car. As bell crank 16 rotates about position 17' induced by the inward motion of pin connection 17 in bearings 32 on the body, the outer end of bell crank 16 at pin 19 is rotated in a greater arc about 17', thus permitting 19' to rotate about hinge 11, and the door thereby to gradually open in synchronism with the motion of the body.

In Fig. 2 on the upturned side, rollers 33 pass out from between guides 34 and 35, leaving the upmoving door in locked position on the body by the toggle 19 acting between 17 on the body and 19' on the door.

As the invention is illustrated to scale in the accompanying drawings for a railroad car of 100,000 pounds normal load capacity, American Railroad Association standards, the clearances can more readily be understood by reference to the outline of a standard railroad truck as shown under the parts described above, in which 40 is the center line of axle, 41 shows normal clearance at the side frame, and 42 clearance at the wheel. The central portion 43 is the top line of the truck bolster, 44 being the truck side bearing practically in line with the wheel 42. Center plate 45 forms swivel contact between the truck and underframe.

The moving parts of the door control mechanism as described above move bodily inwardly toward the center sill 2 of the underframe, and upwardly toward alignment with the floor 10 of the body, as the latter moves downwardly to open position, thus maintaining and to some extent improving clearances about the truck, leaving clearances for transverse tilting of the truck and for swiveling under the underframe when the body and door are in open position.

This door control mechanism requires no movement of its parts about its connections on the upturning side; it is free from binding conditions between the underframe, body and doors when in upright position, and it maintains this freedom of relationship throughout the movement of its parts during the downturning action.

Careful study of the door controlling mechanisms in use on vehicles of the character here considered, has brought into relief the importance of flexibility of the mechanism in its coincidental contacts between the body and the underframe. In the application here illustrated on a railroad car which prominently emphasizes the importance of this phase of the subject, the selective engagement is shown between the mechanism and the underframe. There may occur conditions in automobile truck designs in which this selective engagement may more conveniently be set up between the body and the mechanism; and, the manner in which the doors are operated generally with relation to the underframe or body may also influence the arrangement. Flexibility for independent movement of the heavier parts of the structure generally without introducing excessive or binding strains in the mechanism is an important factor.

I claim:

1. In a dump vehicle, an underframe, a body, means for supporting said body on said underframe whereby the body may be selectively tilted for dumping to one side or the other on axes approaching the dumping side, side doors hinged to the body to fold down for opening, and independent devices for each door for automatically controlling the opening and closing of the door through which dumping is to be effected, for holding the door closed at the elevated side, and for holding the doors closed during transit, each door controlling device including a bell crank pivotally supported on the body, a link connecting one arm of said bell crank with a door extension, said arm and said link serving as a self-locking toggle for locking the door when in closed position, the other arm of said bell crank having a loose shiftable connection with the underframe during transit and dumping.

2. In a dump vehicle, an underframe, a body, means for supporting said body on said underframe whereby the body may be selectively tilted for dumping to one side or the other on axes approaching the dumping side, side doors hinged to the body to fold down for opening, and independent devices for each door for automatically controlling the opening and closing of the door through which dumping is to be effected, for holding the door closed at the elevated side, and for holding the doors closed during transit, each door controlling device including a bell crank pivotally supported on the body, a link connecting one arm of said bell crank with a door extension, said arm and said link serving as a self-locking toggle for locking the door when in closed position, the other arm of said bell crank having a roller, spaced guides carried by the underframe adapted to loosely contact with the roller for preventing the breaking of the toggles during transit, and adapted to operate through said roller for releasing the toggles and for controlling the opening and closing of the door at the dumping side.

3. In a dump vehicle, an underframe, a body, means for supporting said body on said underframe whereby the body may be selectively tilted for dumping to one side or the other on axes approaching the dumping side, side doors hinged to the body to fold down for opening, and independent devices for each door for automatically controlling the opening and closing of the door through which dumping is to be effected, for holding the door closed at the elevated side, and for holding the doors closed during transit, each door controlling device including a bell crank pivotally supported on the body, a link connecting one arm of said bell crank with a door extension, said arm and said link serving as a self-locking toggle for locking the door when in closed position, the other arm of said bell crank having a roller, spaced guides carried by the underframe adapted to loosely contact with the roller for preventing the breaking of the toggles during transit, and adapted to operate through said roller for releasing the toggles and for controlling the opening and closing of the door at the dumping side, the connection between the first-named arm of the bell crank and the link including means whereby the door may move toward closed position upon striking an obstruction during tilting for dumping.

CHAS. H. CLARK.